(12) United States Patent
Li et al.

(10) Patent No.: US 9,003,397 B2
(45) Date of Patent: Apr. 7, 2015

(54) SYSTEM AND METHOD FOR SUPPORTING AUTOMATICALLY DEPLOYING/UNDEPLOYING APPLICATION COMPONENTS IN A TRANSACTIONAL MIDDLEWARE MACHINE ENVIRONMENT

(75) Inventors: Zhenyu Li, Beijing (CN); Lidan Liu, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 54 days.

(21) Appl. No.: 13/423,035

(22) Filed: Mar. 16, 2012

(65) Prior Publication Data
US 2013/0086576 A1    Apr. 4, 2013

Related U.S. Application Data

(60) Provisional application No. 61/541,059, filed on Sep. 29, 2011.

(51) Int. Cl.
G06F 9/445   (2006.01)
H04L 12/911  (2013.01)
G06F 9/50    (2006.01)

(52) U.S. Cl.
CPC .............. *H04L 47/70* (2013.01); *G06F 9/5072* (2013.01); *G06F 2209/508* (2013.01)

(58) Field of Classification Search
None
See application file for complete search history.

(56) References Cited

U.S. PATENT DOCUMENTS

| | | | |
|---|---|---|---|
| 5,995,945 A | 11/1999 | Notani et al. | |
| 6,075,938 A | 6/2000 | Bugnion et al. | |
| 6,640,238 B1 | 10/2003 | Bowman-Amuah | |
| 7,376,945 B1 * | 5/2008 | Kakumani et al. | 717/171 |
| 7,458,073 B1 * | 11/2008 | Darling et al. | 717/168 |
| 7,506,335 B1 * | 3/2009 | Wooff et al. | 717/173 |
| 7,530,065 B1 * | 5/2009 | Ciudad et al. | 717/174 |
| 7,657,887 B2 * | 2/2010 | Kothandaraman et al. | 717/176 |
| 7,827,549 B2 * | 11/2010 | Tarassov | 717/174 |
| 8,196,133 B2 * | 6/2012 | Kakumani et al. | 717/172 |
| 8,443,438 B1 | 5/2013 | Sharir et al. | |
| 8,484,638 B2 * | 7/2013 | Tal et al. | 717/177 |
| 8,527,545 B2 * | 9/2013 | Bobick et al. | 707/793 |
| 8,572,612 B2 | 10/2013 | Kern | |

(Continued)

OTHER PUBLICATIONS

Cala et al., "Automatic Software Deployment in the Azure Cloud," 2010, Distributed Applications and Interoperable Systems Lecture Notes in Computer Science vol. 6115, pp. 155-168.*

(Continued)

*Primary Examiner* — Thuy Dao
*Assistant Examiner* — Stephen Berman
(74) *Attorney, Agent, or Firm* — Meyer IP Law Group

(57) ABSTRACT

A system and method can support automatically deploying application components in a transactional middleware machine environment. A deployment center can receive one or more application packages, each of which contains binary files for one or more transactional servers and configuration information that describes relationship and parameters of the one or more transactional servers in the application package. The deployment center can further generate one or more distribution packages for each transactional middleware machine in the transactional middleware machine environment based on the one or more application packages. Then, the deployment center can deploy the one or more distribution packages to the plurality of transactional middleware machines in the transactional middleware machine environment.

18 Claims, 13 Drawing Sheets

(56) References Cited

U.S. PATENT DOCUMENTS

| | | | |
|---|---|---|---|
| 8,615,761 | B2 | 12/2013 | Machida |
| 8,863,114 | B2 * | 10/2014 | Shah ............................ 717/175 |
| 2003/0050932 | A1 | 3/2003 | Pace et al. |
| 2003/0131084 | A1 * | 7/2003 | Pizzorni et al. ............... 709/223 |
| 2003/0167270 | A1 | 9/2003 | Werme et al. |
| 2003/0172135 | A1 | 9/2003 | Bobick et al. |
| 2008/0082689 | A1 | 4/2008 | Saad |
| 2008/0256531 | A1 | 10/2008 | Gao et al. |
| 2008/0275933 | A1 | 11/2008 | Agrawal et al. |
| 2011/0137935 | A1 * | 6/2011 | Bobick et al. ................. 707/769 |
| 2011/0179134 | A1 | 7/2011 | Mayo et al. |
| 2011/0213884 | A1 | 9/2011 | Ferris et al. |
| 2011/0231837 | A1 * | 9/2011 | Sheehan et al. ............... 717/175 |
| 2012/0096453 | A1 * | 4/2012 | Meilstrup et al. ............. 717/175 |
| 2012/0137282 | A1 * | 5/2012 | Illowsky et al. .............. 717/177 |
| 2012/0167073 | A1 * | 6/2012 | Stevens ........................ 717/175 |

OTHER PUBLICATIONS

Isard, "Autopilot: automatic data center management," 2007, ACM SIGOPS Operating Systems Review—Systems work at Microsoft Research, vol. 41 Issue 2, pp. 60-67.*

Kecskemeti et al., "Automatic Service Deployment Using Virtualisation," 2008, Parallel, 16th Euromicro Conference on Distributed and Network-Based Processing, pp. 628-635.*

Rayns et al., TXSeries for Multiplatforms Version 6 Revealed, 2006, IBM Redbooks Paper, pp. 1-42.

U.S. Patent and Trademark Office, International Searching Authority, International Search Report and Written Opinion dated Nov. 29, 2012, International Application No. PCT/US2012/057131, 7 pages.

U.S. Patent and Trademark Office, International Searching Authority, International Search Report and Written Opinion dated Nov. 29, 2012, International Application No. PCT/US2012/057136, 8 pages.

* cited by examiner

600

| | |
|---|---|
| Logical Name | ldnx24  ~601 |
| Physical Name | ldnx24 |
| Operation System | Oracle Enterprise Linux 5.5 |
| Machine Architecture | Exalogic X2-2, X86-64 |
| C/C++ and COBOL compilers | C/C++: gcc/g++ 4.1.2 200807048 |
| Tuxedo installation | Oracle Enterprise Linux 5.5 |
| Tuxedo Word Size | 64bit |
| Tuxedo Version | TUX11gR1 |
| TUXDIR | /nfs/lcfilerc/vol1/TUX11gR1 |
| Data Base Type | |
| Data Base Version | |

| Application Package Name | APP1.jar  /701 |
| --- | --- |
| Tuxedo Version | TUX11gR1 |
| Supported Operation System | Oracle Enterprise Linux 5.5 |
| Tuxedo Word Size | 64bit |
| Machine Architecture | Exalogic X2-2, X86-64 |
| Services | TOUPPER1 |
| Dependent Services | |
| Data Base Type | |
| Data Base Version | |

*FIGURE 7*

SYSTEM AND METHOD FOR SUPPORTING AUTOMATICALLY DEPLOYING/UNDEPLOYING APPLICATION COMPONENTS IN A TRANSACTIONAL MIDDLEWARE MACHINE ENVIRONMENT

CLAIM OF PRIORITY

This application claims the benefit of priority on U.S. Provisional Patent Application No. 61/541,059, entitled "SYSTEM AND METHOD FOR SUPPORTING A DYNAMIC RESOURCE BROKER IN A TRANSACTIONAL MIDDLEWARE MACHINE ENVIRONMENT" filed Sep. 29, 2011, which application is herein incorporated by reference.

CROSS-REFERENCED APPLICATIONS

The current application hereby incorporates by reference the material in the following patent applications:

U.S. patent application Ser. No. 13/423,024, entitled "SYSTEM AND METHOD FOR SUPPORTING A DYNAMIC RESOURCE BROKER IN A TRANSACTIONAL MIDDLEWARE MACHINE ENVIRONMENT," filed Mar. 16, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to supporting a transactional middleware machine environment.

BACKGROUND

A transactional middleware system, or transaction oriented middleware, includes enterprise application servers that can process various transactions within an organization. With the developments in new technologies such as high performance network and multiprocessor computers, there is a need to further improve the performance of transactional middleware. These are the generally areas that embodiments of the invention are intended to address.

SUMMARY

Described herein is a system and method for supporting automatically deploying application components in a transactional middleware machine environment. A deployment center can receive one or more application packages, each of which contains binary files for one or more transactional servers and configuration information that describes relationship and parameters of the one or more transactional servers in the application package. The deployment center can further generate one or more distribution packages for each transactional middleware machine in the transactional middleware machine environment based on the one or more application packages. Then, the deployment center can deploy the one or more distribution packages to the plurality of transactional middleware machines in the transactional middleware machine environment.

BRIEF DESCRIPTION OF THE FIGURES

FIG. 6 shows an illustration of creating a machine list in a GUI Console, in accordance with an embodiment of the invention.

FIG. 7 shows an illustration of uploading application packages, in accordance with an embodiment of the invention.

DETAILED DESCRIPTION

Figure 1:
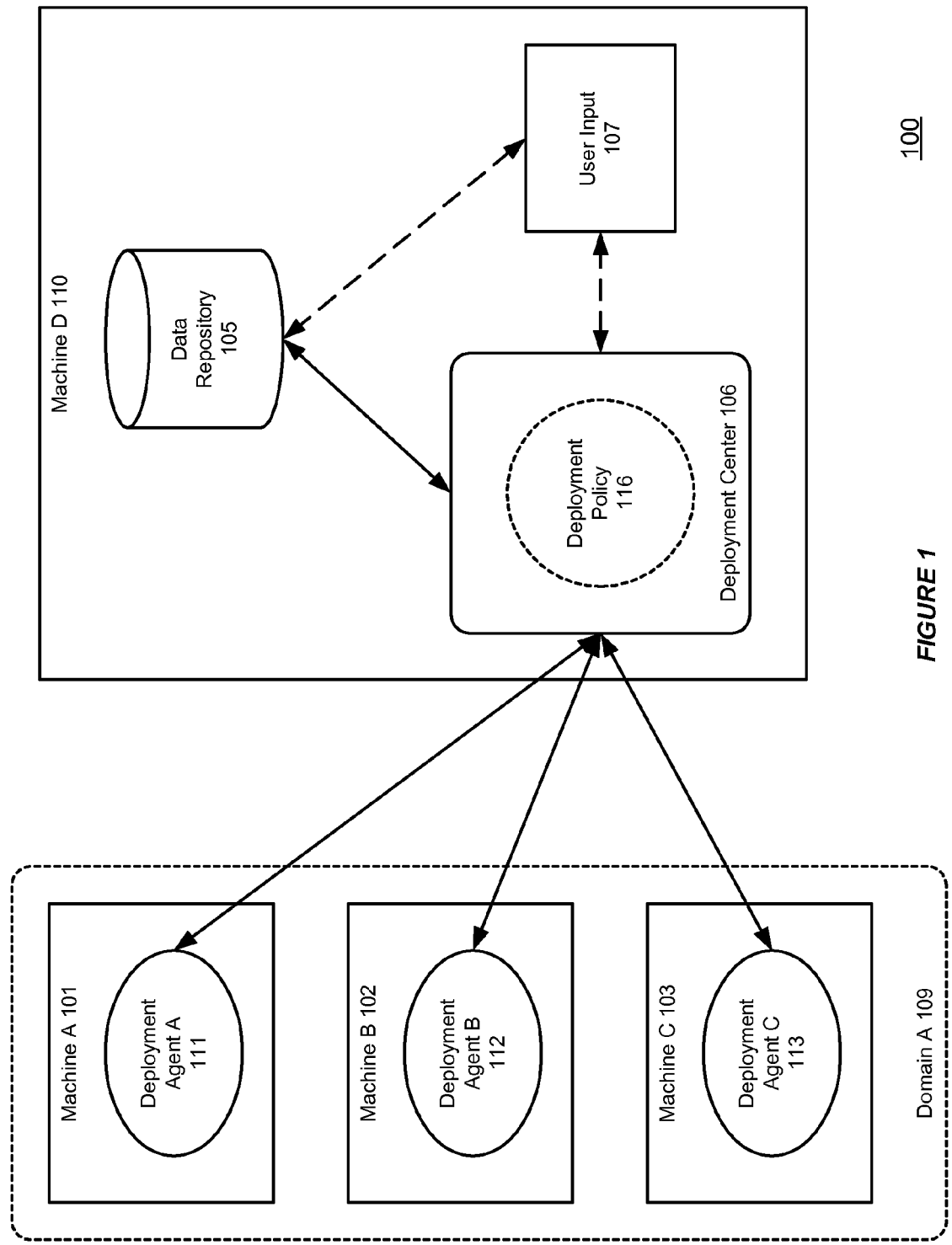
FIG. 1 shows an illustration of a transactional middleware machine environment that supports a dynamic resource broker, in accordance with an embodiment of the invention.

Described herein is a system and method for supporting a transactional middleware system that can take advantage of fast machines with multiple processors, and a high performance network connection. A dynamic resource broker can dynamically scale up/down a transactional system in the transactional middleware machine environment by adding/removing groups and machines according to the resource usage changes. The transactional middleware machine environment can comprise a deployment center in the transactional middleware machine environment, wherein the deployment center maintains one or more deployment policies for the transactional middleware machine environment, and one or more deployment agents, each of which is associate with a transactional middleware machine of a plurality of transactional middleware machines in a transactional domain in the transactional middleware machine environment. The deployment center operates to receive machine usage information from the one or more deployment agents, and dynamically scale up or down resource used in the transactional domain based on the resource usage information collected by the one or more deployment agents.

In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateways, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

In accordance with an embodiment of the invention, a transactional system, e.g. Tuxedo, can be a set of software modules that enables the construction, execution, and administration of high performance, distributed business applications and has been used as transactional middleware by a number of multi-tier application development tools. The transactional system is a platform that can be used to manage distributed transaction processing in distributed computing environments. It is a platform for unlocking enterprise legacy applications and extending them to a services oriented architecture, while delivering unlimited scalability and standards-based interoperability.

A dynamic resource broker can automatically deploy application components of a transaction system, e.g. a Tuxedo, in a transactional middleware machine environment. Thus, the transactional system can take advantage of fast machines with multiple processors, e.g. Exalogic middleware machines, and a high performance network connection, e.g. an Infiniband (IB) network.

Dynamic Resource Broker

In accordance with an embodiment of the invention, a dynamic resource broker allows the users to automatically deploy/undeploy transactional middleware applications to different remote machines. This can be beneficial to the users of the transactional middleware applications. For example, as a command line style middleware product, Tuxedo applications can also be deployed to a single machine or multiple network-connected machines manually. However, using the manual mode, users need to login every machine to deploy their applications even when there are a large number of network-connected machines.

FIG. 1 shows an illustration of a transactional middleware machine environment that supports automatically deploying/undeploying application components, in accordance with an embodiment of the invention. As shown in FIG. 1, the transactional middleware machine environment 100 includes a plurality of transactional middleware machines, such as Machines A-D 101-103 and 110.

A dynamic resource broker can include components such as: a data repository 105 on Machine D 110, a deployment center 106 on Machine D 110, and one or more deployment agent, Agents 111-113, each of which resides on a transactional middleware machine, Machine A-C 101-103 in the transactional middleware machine environment 100.

The data repository 105 can be used to store the related information, such as: application packages, distribution packages and configuration files. The deployment center 106 can receive all the user inputs 107 and is responsible for distributing the instructions/packages to the destination machines, Machines A-C 101-103, based on one or more deployment policies 116. Furthermore, the deployment center 106 is responsible for receiving the execution result from the destination machines, Machines A-C 101-103. Each deployment agent, Agent 111-113, is responsible for receiving the distribution packages, executing the deployment/un-deployment/management tasks, and providing the execution result back to the deployment center 106.

In an example as shown in FIG. 1, a user can first upload the application packages to the data repository 105. Then, the user can create a domain, Domain A 109, which includes two machines: Machine A 101 and Machine B 102. Then, the user can notify the deployment center 106 to perform the deployment tasks. The deployment center 106 can deploy the distribution packages to Machine A 101 and Machine B 102 and boot Domain A 109.

Additionally, Domain A 109 can include a third machine, Machine C 103, as the candidate machine that may be dynamically activated at runtime. For example, when the CPU usage of Machine B 102 increases to 100%, the deployment center can activate Machine C 103 to share the load with Machine B 102. The deployment center 106 can distribute the packages to Machine C, and instruct the deployment agent, Agent C 113, to perform management tasks, such as Tuxedo Management Information Base (MIB) operations. Once the management tasks have been successfully performed, Machine C 103 can be dynamically added to Domain A, and all the servers and services on Machine C 103 can be activated.

Figure 2:
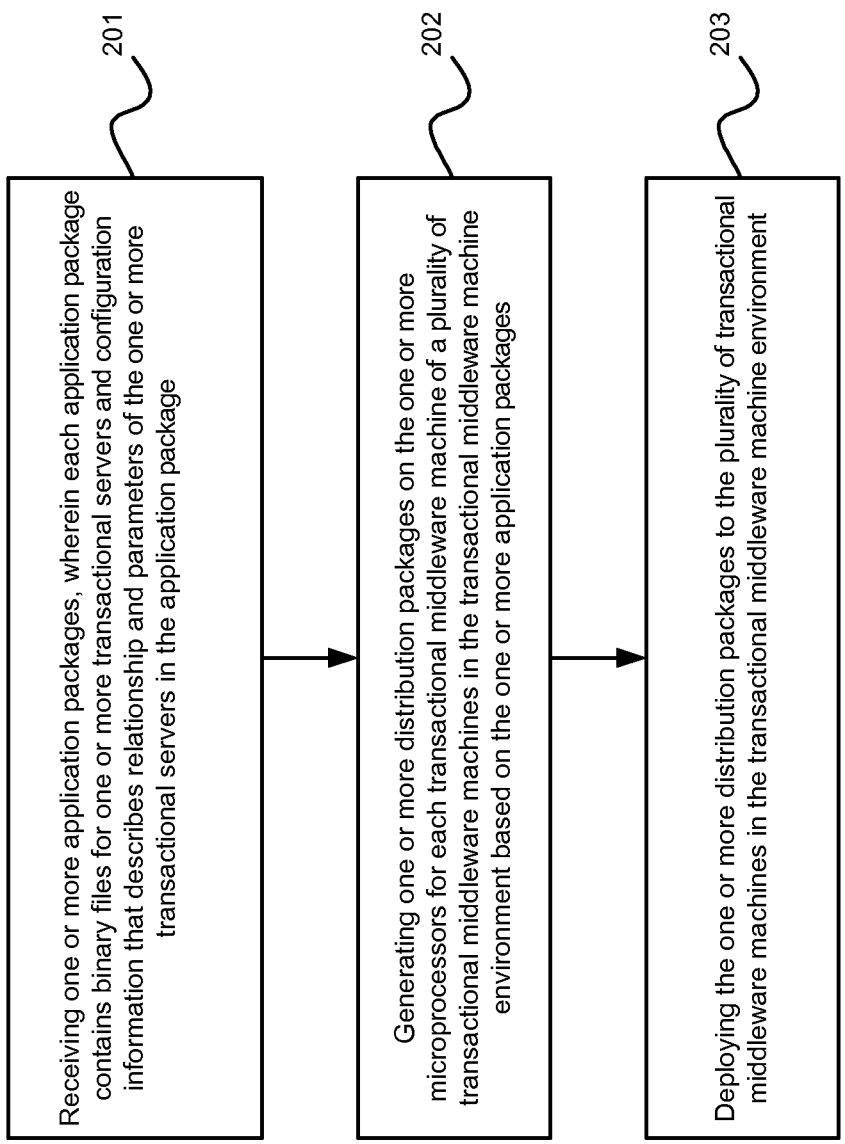
FIG. 2 illustrates an exemplary flow chart for supporting automatically deploying/undeploying application components in a transactional middleware machine environment, in accordance with an embodiment of the invention.

FIG. 2 illustrates an exemplary flow chart for supporting automatically deploying/undeploying application components in a transactional middleware machine environment, in accordance with an embodiment of the invention. As shown in FIG. 2, at step 201, a data repository can receive one or more application packages, wherein each application package contains binary files for one or more transactional servers and configuration information that describes relationship and parameters of the one or more transactional servers in the application package. Then, at step 202, a deployment center can generate one or more distribution packages on the one or more microprocessors for each transactional middleware machine of a plurality of transactional middleware machines in the transactional middleware machine environment based on the one or more application packages. Finally, at 203, the deployment center can deploy the one or more distribution packages to the plurality of transactional middleware machines in the transactional middleware machine environment.

In accordance with an embodiment of the invention, and as disclosed below, the deployment of a transactional application, such as a Tuxedo application, includes several steps: application packages distribution, Tuxedo system environment setup, Tuxedo configuration files generation, and Tuxedo system booting, each of which will be discussed in the following sections.

Application Package

In accordance with an embodiment of the invention, an application package is an archive package that can be prepared by the users or customers and deployed on one or more middleware machines. An application package contains the compiled binary files and other environment files and can be organized based on the machine which is to be deployed with the transactional applications.

For example, a transactional application, such as a Tuxedo application, can be based on one or more application packages, each of which can be a zip file. The Tuxedo application (domain) can be defined in a TUXCONFIG, or UBBCONFIG configuration file, that specifies a set of machines, servers, and other resources. The Tuxedo application can exist on a single machine or across multiple network-connected machines. Users can first upload their application packages, in order to deploy the Tuxedo application.

Figure 3:
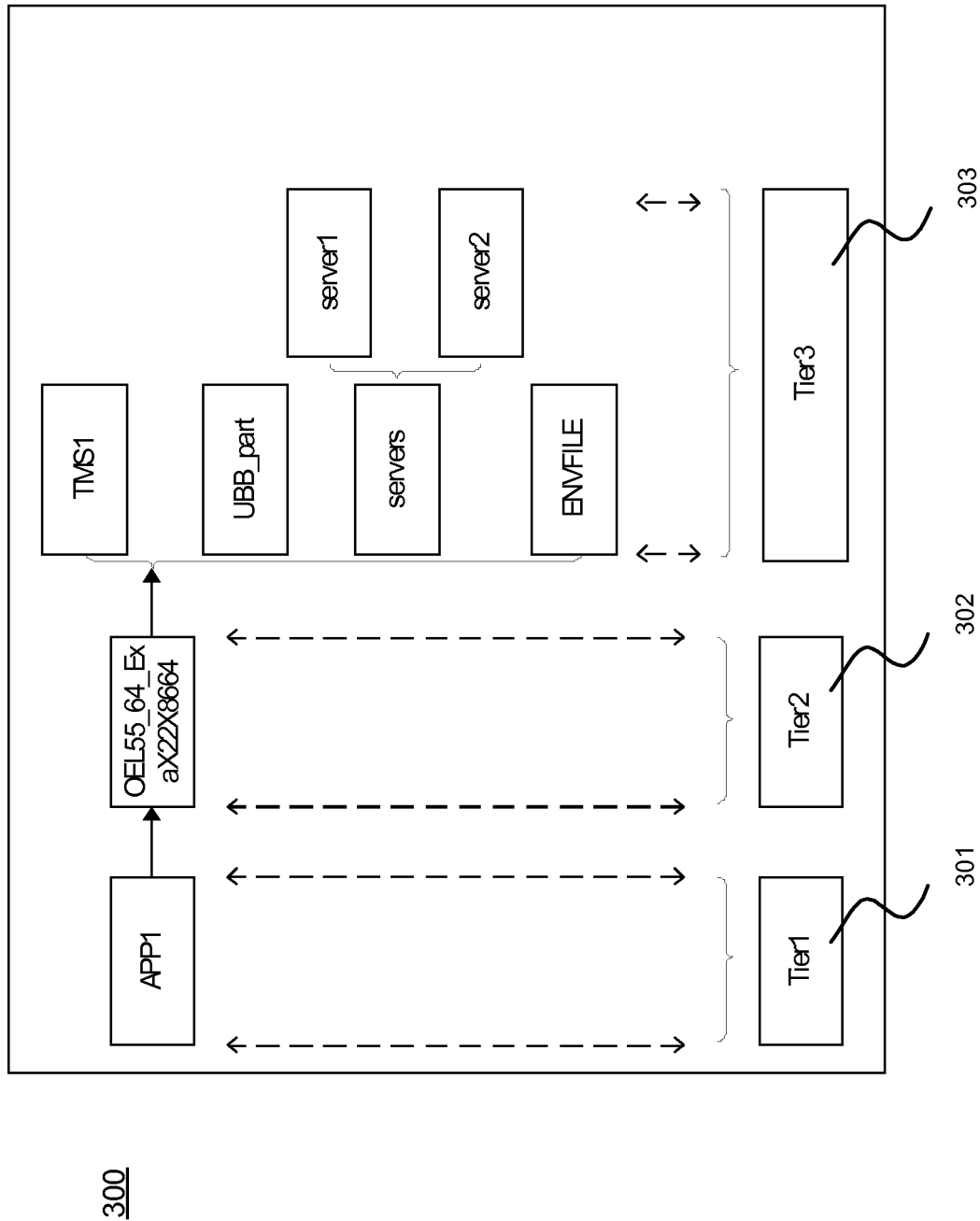
FIG. 3 shows an illustration of the internal structure of an application package in a middleware machine environment, in accordance with an embodiment of the invention.

FIG. 3 shows an illustration of the internal structure of an application package in a middleware machine environment, in accordance with an embodiment of the invention. As shown in FIG. 3, an application package 300 can include multiple tiers, e.g. Tier 1 301, Tier 2 302, and Tier 3 303.

Tier 1 301 includes a name for the application package 300, which can be unique within all the uploaded application package names.

Tier 2 302 can be a child directory under Tier 1 301. Tier 2 302 contains a name that stands for the information about the platform the application package 300 can be deployed to. As show in FIG. 3, Tier 2 can be used to represent a machine type, OEL55_64_ExaX22X8664.

Tier 3 303 includes child directories Tier 2 302, which contains the compiled binary files used by the transactional system, such as application servers, TMS servers, clients and so on. As show in FIG. 3, under OEL55_64_ExaX22X8664 (Tier 2 302), the sub-directory "servers" can have two compiled server binary files: server1 and server2.

Furthermore, Tier 3 303 can contain different environmental files, such as Tuxedo machine level ENVFILE, Tuxedo group level ENVFILE, Tuxedo server level ENVFILE, and Tuxedo server level RCMD file. Additionally, under Tier 3 303, there can be sub-directories, where users can organize their applications.

Additionally, Tier 3 303 can contain a universal bulletin board configuration file, such as a Tuxedo UBB_part file, which is a group level UBBCONFIG file. The Tuxedo UBB_part file contains the GROUPS, RMS, SERVERS, SERVICES, ROUTINGS sections of a complete UBBCONFIG file and is mainly used to describe the relationship and parameters of all the servers within this package. The Tuxedo UBB_part file can be used to generate the UBBCONFIG file when decide to deploy this package to a machine and its content can be modified at that time.

Application Directory

In accordance with an embodiment of the invention, an application package can be can be used repeatedly in a transactional middleware machine environment. For example, an application package can be applied to different domains, different machines in one domain or a single machine in one domain for multiple times.

Additionally, the dynamic resource broker can generate distribution packages that are deployed to the destination machines based on the application packages. After a distribution package is deployed to a destination machine, the transactional system can create an application directory on the destination machine.

Figure 4:
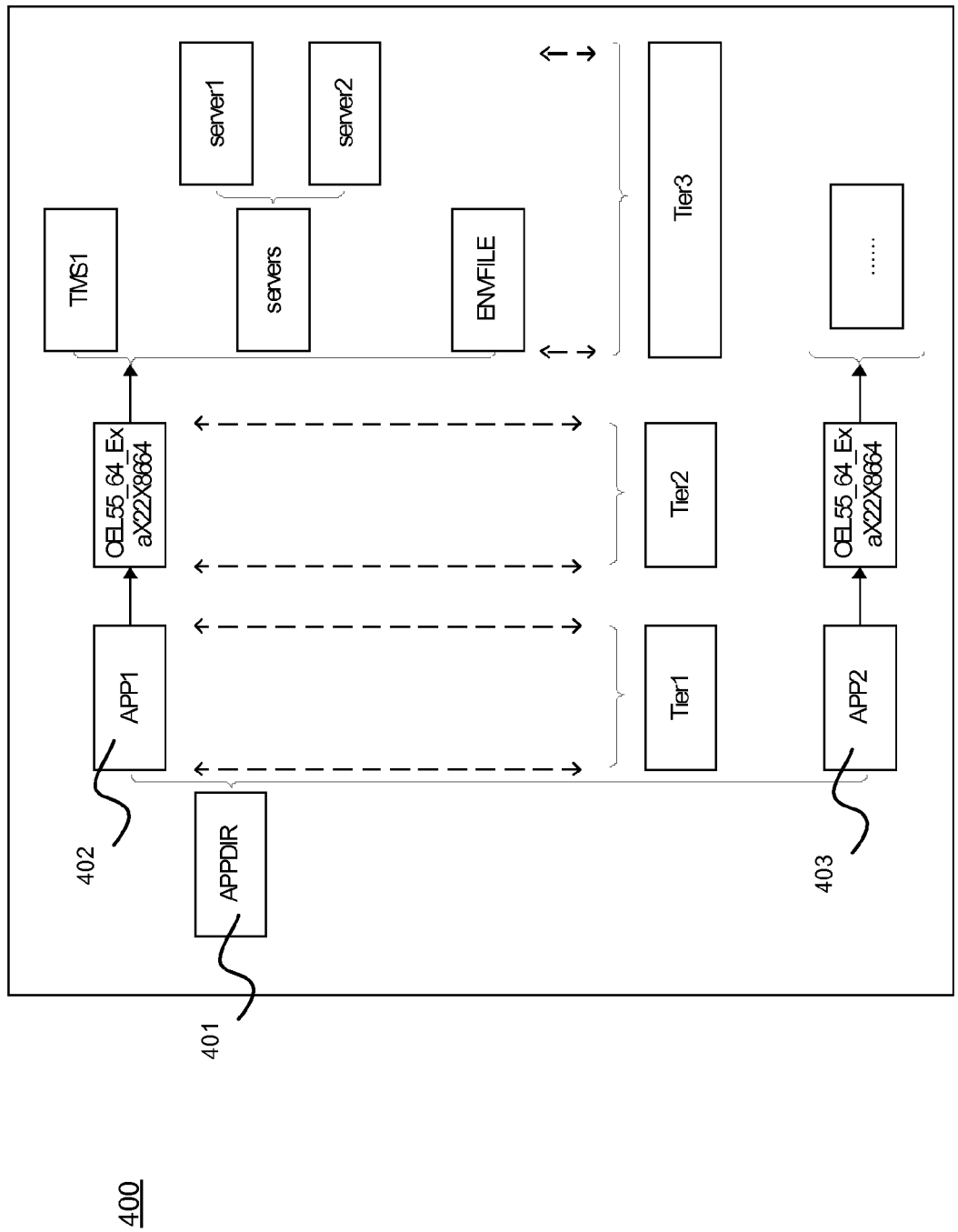
FIG. 4 shows an illustration of the internal structure of an application directory in a middleware machine environment, in accordance with an embodiment of the invention.

FIG. 4 shows an illustration of the internal structure of an application directory in a middleware machine environment, in accordance with an embodiment of the invention. As shown in FIG. 4, an application directory, such as a Tuxedo application directory APPDIR 401, can include multiple sub-directories, APP1 402 and APP2 403, for containing distribution packages for different applications. The structure of a deployed Tuxedo application 400 under the application directory, APPDIR 401, can resemble the structure of the application packages, with the exception of the Tuxedo UBB_part file.

Upload Application Package

In accordance with an embodiment of the invention, users can upload one or more prepared application packages to a data repository. Once the upload of the application packages is successful, the system allows the users to fill an application package information list, the content of which is shown in the following Table 1.

TABLE 1

| Item | Description |
| --- | --- |
| Application Package Name | The application package name, for example APP1. |
| Tuxedo Version | The Tuxedo Version this package is built on, for example, TUX11g. This item is just used for the users to indicate when they use this package later. |
| Supported Operation System | The Operation System this package can be deployed to. This information will be compared with the corresponding item in Machine list when deploy. E.g. "Oracle Enterprise Linux 5.5" and "Oracle Solaris 11 Express". |
| Tuxedo Word Size | To describe the word size this package is build on. For example, 32 bit or 64 bit. This information can be compared with the corresponding item in Machine list when deploy. |
| Machine Architecture | To describe which machine architecture this package can apply to. The candidate is: "Exalogic X2-2, X86-64" and "Exalogic X2-2, SPARC". This can be compared with the corresponding item in Machine list when deploy. |
| Services | The all services names supplied by this package. For example, TOUPPER1, TOUPPER2. |
| Dependent Services | The dependent service of this package. That means when users deploy this package, they must assure the packages which contain the dependent service are also deployed. This information is just for users to reference, the system will not check it automatically. |
| Data Base Type | If the application within this package relates to the Data Base, then please indicate the Data Base Type. This information is just for users to reference later, the system will not check it automatically. |
| Data Base Version | If the application within this package relates to the Data Base, then please indicate the Data Base Version. This information is just for users to reference later, the system will not check it automatically. |

Create Machine List

In accordance with an embodiment of the invention, before a domain is created, users can create a list of machines that the application packages are deployed to. For each machine, users can fill a form that describes this particular machine. The content of the form is shown in the following Table 2.

TABLE 2

| Item | Description |
|---|---|
| Logical Name | It's the logical name of this machine and is named by the customer. The length of it must be 30 characters or less. This name must be unique among all the machines and can be the same with the machine's physical name. |
| Physical Name | It's the physical name of a processor, for example, the value produced by the UNIX system uname -n command. The length of it must be 30 characters or less. |
| Operation System | The operation system installed on this machine. |
| Machine Architecture | To describe this machine's architecture. The candidate is: "Exalogic X2-2, X86-64" and "Exalogic X2-2, SPARC". This will be compared with the "Machine Architecture" item in application package list when deploy. |
| C/C++ and COBOL compilers | This specifies the cc version and so on. And this information is just for users to reference. |
| Tuxedo installation | Specifies the Tuxedo's installation OS version. This information will be compared with the corresponding item "Supported Operation System" in application package list when deploy an application package to this machine. Now this feature only supports: "Oracle Enterprise Linux 5.5" and "Oracle Solaris 11 Express". |
| Tuxedo Word Size | To describe the word size of the Tuxedo installed on this machine. For example, 32 bit or 64 bit. This information will be compared with the corresponding item "Tuxedo Word Size" in application package list when deploy an application package to this machine. |
| Tuxedo Version | The Tuxedo Version, for example, TUX11g. This item is just used for the users to reference when they use this machine. |
| TUXDIR | The TUXDIR for the Tuxedo system installed on this machine. We only acknowledge one TUXDIR directory in one machine. |
| Data Base Type | All the Data Base types installed on this machine. This item is just used for the users to reference when they use this machine. |
| Data Base Version | All the Data Base Versions installed on this machine. This item is just used for the users to reference when they use this machine. |

In the above machine list, all the machines can be named by its logical names. The logical name of a machine can be unique in the machine list, and the logical name of a machine can be the same as a physical name of the machine. Thus, one physical machine can have more than one logical name and have more than one instance in the machine list. Therefore, the users can specify multiple logical names for one physical machine, and deploy the different application packages to the same machine, e.g. in the case of the faked MP model in a testing environment.

UBBCONFIG Automatic Generation Rules

In accordance with an embodiment of the invention, users can choose to automatically generate configuration files for the transactional servers, e.g. the UBBCONFIG file for each Tuxedo server. The UBBCONFIG file can include different sections, such as a RESOURCE section, a MACHINES section, a GROUPS section, a RMS section, a NETGROUPS section, a NETWORK section, a SERVERS section, a SERVICES section, a ROUTING Section.

Attached is Appendix A that provides further information regarding supporting a dynamic resource broker in a transactional middleware machine system, and various other aspects of the platform described throughout this disclosure. The information in Appendix A is provided for illustrational purposes and should not be construed to limit all of the embodiments of the invention.

An Example of Automatic Deployment in Tuxedo

In the following sections, an example is used for illustrating the procedure of automatically deploying or undeploying Tuxedo applications in a transactional middleware environment. In this example, two Tuxedo applications, APP1 and APP2, can be automatically deployed on two midldleware machines, IcInx 24 and IcIn16. In other examples, different configurations can be used in a transactional middleware environment without limitation.

Create a Tuxedo Domain

In accordance with an embodiment of the invention, users can prepare the application packages before creating a domain in a transactional middleware for deploying transactional applications. In this example, every machine in the domain uses one application package. In other examples, a machine can have one or more application packages as needed.

Figure 5:
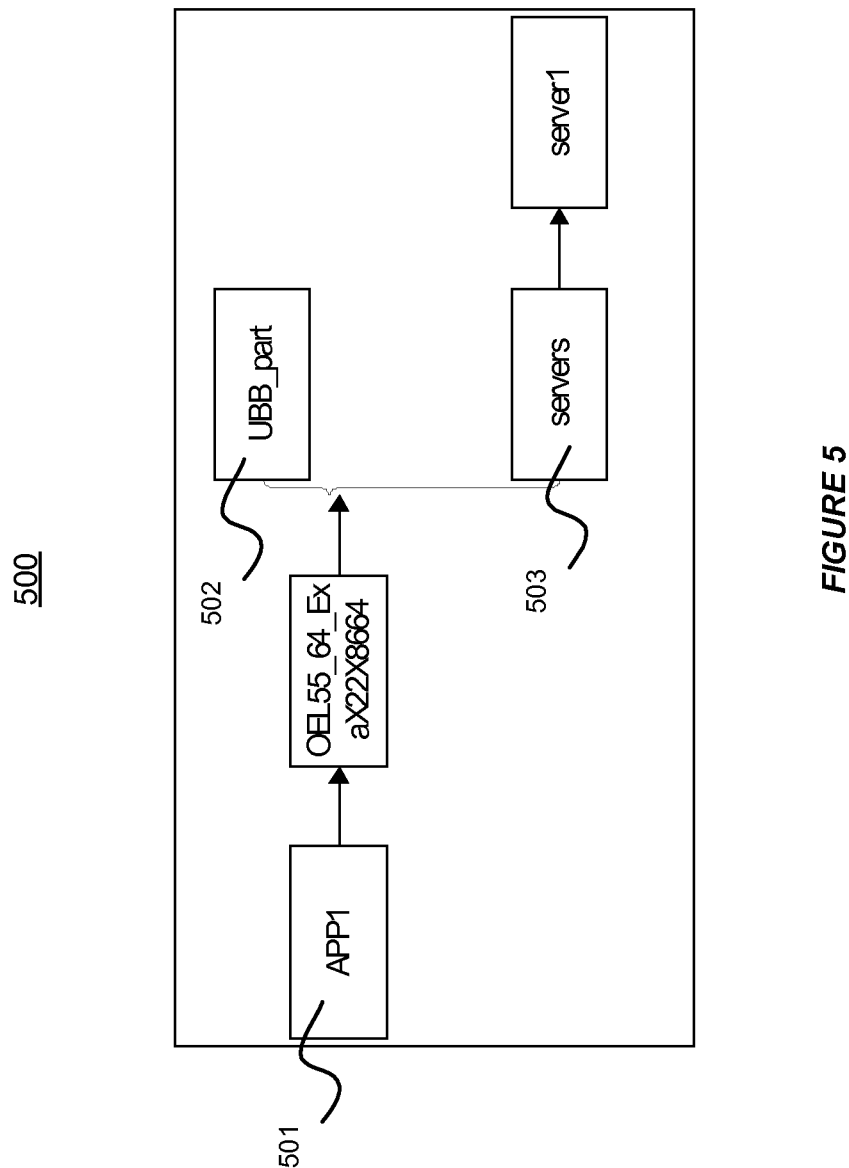
FIG. 5 shows an illustration of preparing an application package, in accordance with an embodiment of the invention.

FIG. 5 shows an illustration of preparing an application package 500, in accordance with an embodiment of the invention. As shown in FIG. 5, an application package, APP1.zip 501, can include a UBB_part section 502 and a servers section 503. The following Listing 1 shows the UBB_part section sections in APP1.zip.

Listing 1

```
*GROUPS:
G1      LMID=simple1    GRPNO=30
*SERVERS
APP1/OEL55__64__ExaX22X8664/servers/simpserv1
                SRVGRP=G1       SRVID=20
                CLOPT="-A"
*SERVICES
                TOUPPER1
```

The above FIG. 5 and Listing 1 illustrate the application package, APP1.zip, for deploying a first application, APP1.

Additionally, in this example, another application package, APP2.zip, can be prepared in a similar fashion for deploying a second application, APP2.

FIG. 6 shows an illustration of creating a machine list for a domain in a GUI Console, in accordance with an embodiment of the invention. As shown in FIG. 6, the GUI Console use a machine form 600 to define different properties associated with a particular machine with a logical name, IcInx24 601. Also as shown in FIG. 6, the entries in the machine form 600 can be based on Table 2 as disclosed above.

Additionally, in this example, another similar machine form (not shown) can be used for setting up a second machine in the system.

FIG. 7 shows an illustration of uploading an application package, in accordance with an embodiment of the invention. As shown in FIG. 7, an application package form 700 can be displayed for requiring a user to file, when users successfully upload an application package 701. Also as shown in FIG. 7, the various entries in the machine form 700 can be based on Table 2 as disclosed above.

Similarly, there can be another application package form (not shown) for uploading the application package, APP2.zip.

Figure 8:
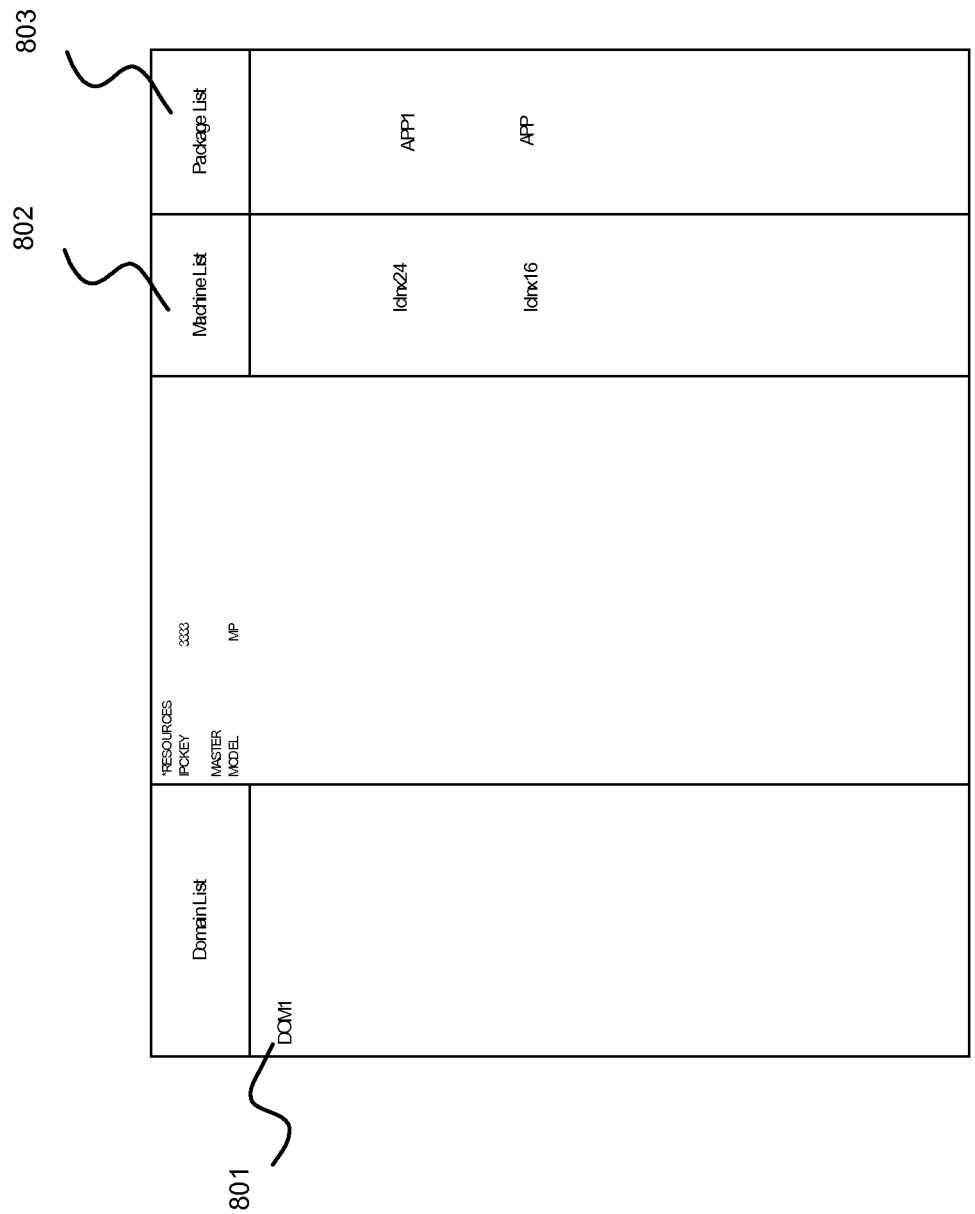
FIG. 8 shows an illustration of creating a domain in a transactional middleware environment, in accordance with an embodiment of the invention.

FIG. 8 shows an illustration of creating a domain in a transactional middleware environment, in accordance with an embodiment of the invention. As shown in FIG. 8, the users can create a domain with a unique domain name, e.g. DOM1 801. This domain can be configured to include machines from a machine list 802 and to run application packages from a package list 803.

When a domain is created in a transactional middleware environment, different templates can be used to automatically generate the configuration files for deployment. For example, the contents of the automatically generated Tuxedo configuration files can be detailed in Appendix A.

Additionally, in Tuxedo, there can be two default UBBCONFIG templates: one UBBCONFIG template for RESOURCES part named UBB_Resource, and another UBBCONFIG template for MACHINES part named UBB_Machine. Also, users can define additional templates and save them to the data repository.

As shown in FIG. 8, at the time when DOM1 801 is created, users can choose the default UBB_Resource template and can indicate that the domain is in MP mode. Furthermore, users can modify and add the values to the RESOURCES section in the configuration file.

Create Virtual Machines in a Tuxedo Domain

In accordance with an embodiment of the invention, users can create one or more virtual machines in a domain. A virtual machine is a symbol that does not stand for a real physical machine. A logical machine from the machine list can be bound to the virtual machine. The naming rule for a virtual machine can be the same as that of a logical machine, and a name for a virtual machine can be unique among all the virtual machines within one domain.

Figure 9:
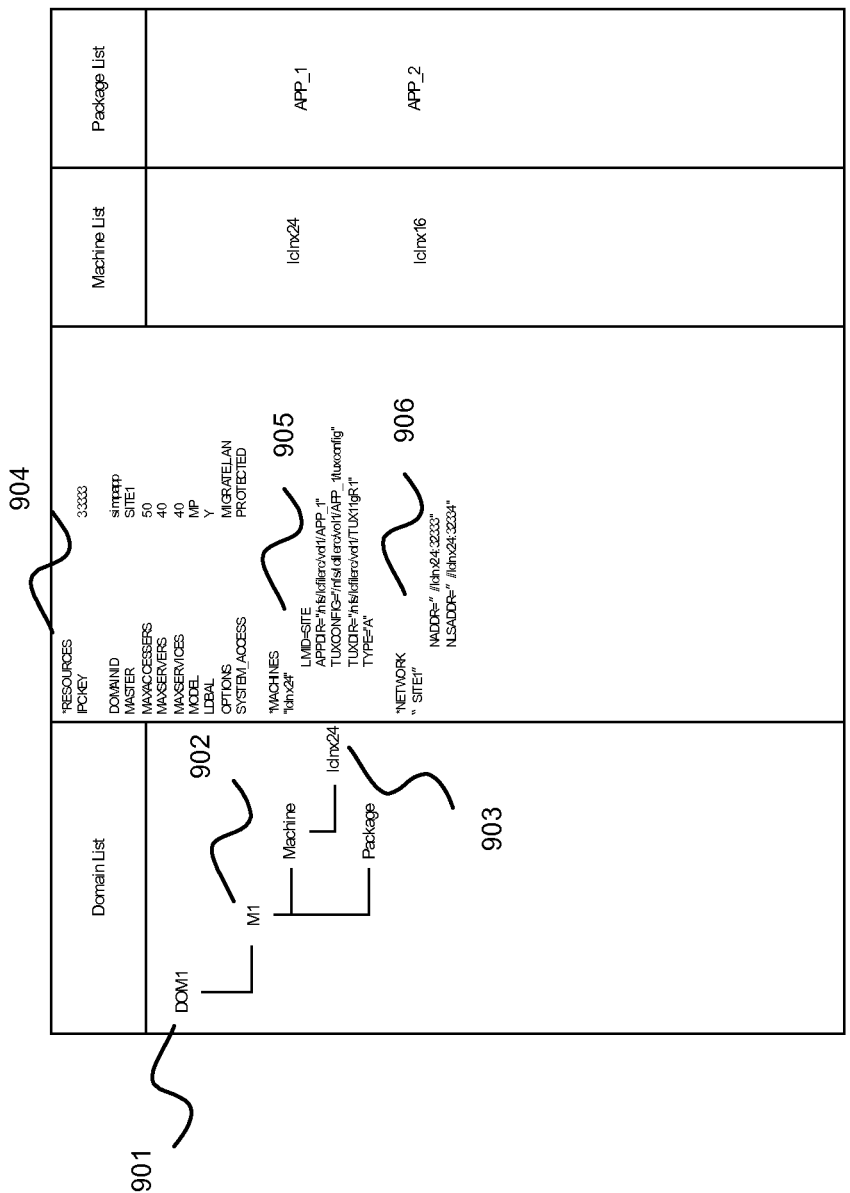
FIG. 9 shows an illustration of binding a physical machine to a virtual machine in a domain, in accordance with an embodiment of the invention.

FIG. 9 shows an illustration of binding a logical machine to a virtual machine in a domain, in accordance with an embodiment of the invention. As shown in FIG. 9, a virtual machine M1 902 is created in DOM1 901. Additionally, users can bind a logical machine, IcInx24 903, from the machine list to the virtual machine M1 902, and can indicate that this logical machine, IcInx24 903, is the master for the domain DOM1 901. Then, the default UBB_Resource section 904 can be added to the UBBCONFIG file and the content can be modified according to the information related to IcInx24 903 in the machine list. Furthermore, users can also modify or add the values to corresponding items of MACHINES section 905 and NETWORK section 906.

Figure 10:
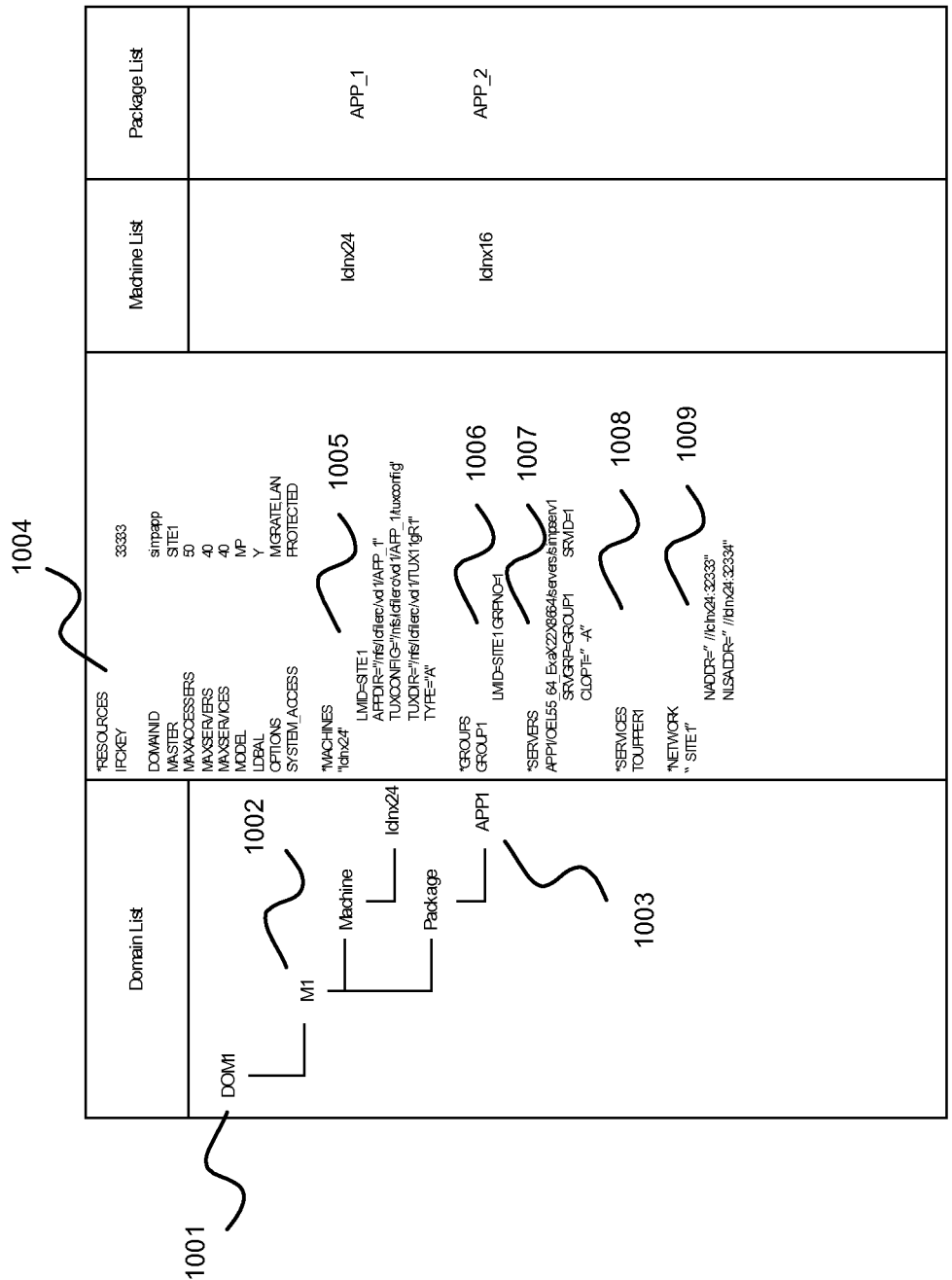
FIG. 10 shows an illustration of adding an application package to a virtual machine in a domain, in accordance with an embodiment of the invention.

FIG. 10 shows an illustration of adding an application package to a virtual machine in a domain, in accordance with an embodiment of the invention. As shown in FIG. 10, users can add an application package, APP1 1003, from the package list to a virtual machine M1 1002 in a domain, DOM1 1001. Then, the UBB_part from the application package APP1, e.g. the default UBB_Resource section 1004, can be added to the UBBCONFIG file and the content can be modified according to the information of the logical machine IcInx24, which is bound to the virtual machine M1 1002. Additionally, users can modify or add the values to items in MACHINES, GROUPS, SERVERS and SERVICES sections 1005-1009.

Figure 11:
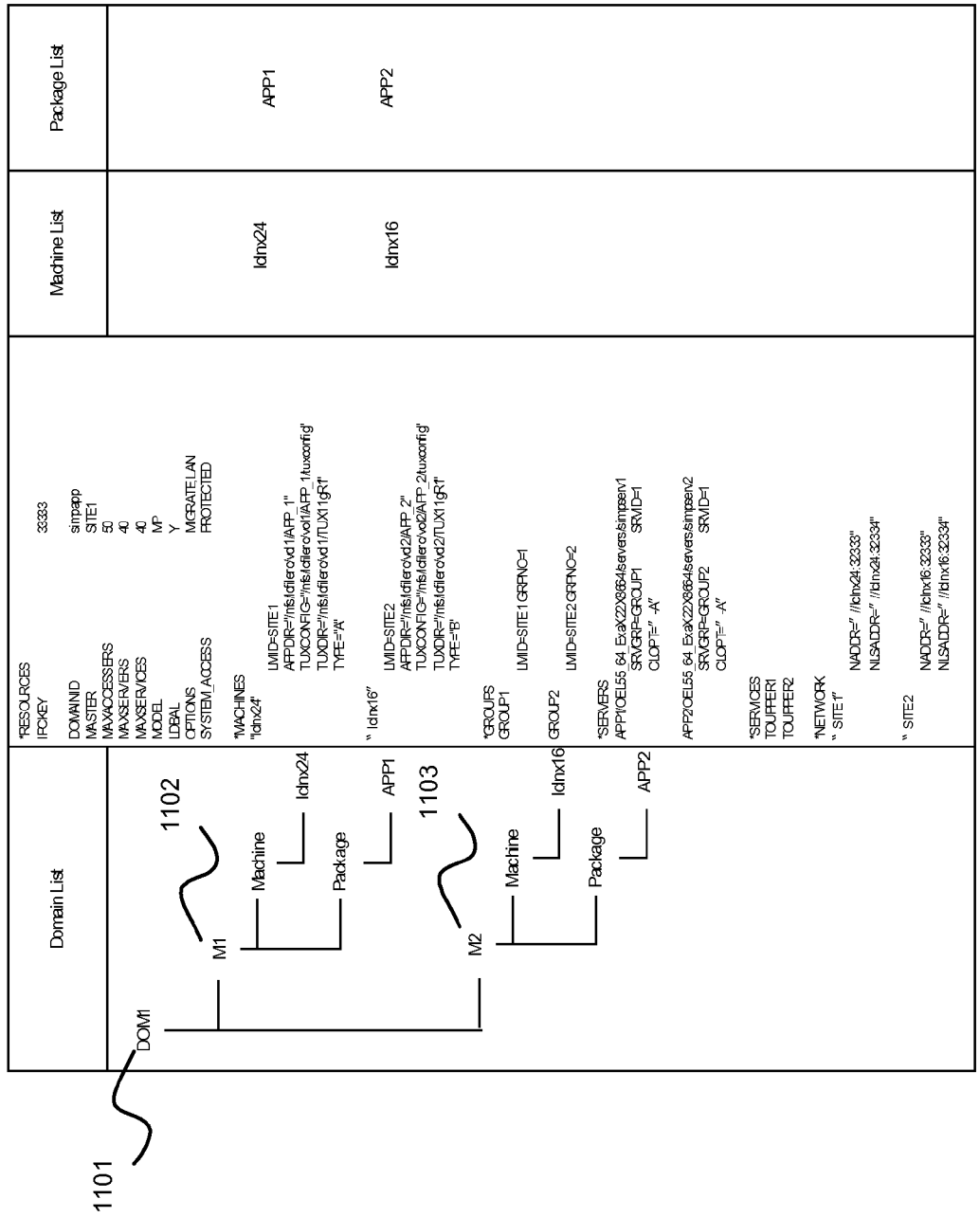
FIG. 11 shows an illustration of setting up multiple virtual machines in a domain, in accordance with an embodiment of the invention.

FIG. 11 shows an illustration of setting up multiple virtual machines in a domain, in accordance with an embodiment of the invention. As shown in FIG. 11, users can create multiple virtual machines, such as a virtual machine, M1 1102 and a virtual machine, M2 1103, in a domain, DOM1 1101. Furthermore, the users can bind a logical machine to a virtual machine. For example, a logical machine, IcInx16, can be bound to the virtual machine M1 1002 and responsible for running application package AZPP1, and a logical machine, IcInx24, can be bound to the virtual machine M2, and responsible for running another application package, APP2.

The system can compare the information in the application package form with the machine form, every time when an archive package is added to a virtual machine bound to a logical machine. If there is an error, the system can report the error to the users.

Configure a Tuxedo Domain

In accordance with an embodiment of the invention, the system can provide configuration templates for each machine in a domain.

In Tuxedo, users can select and modify the default DMCONFIG templates from the data repository. Additionally, the data repository can provide a setenv.ksh template for each machine. Users can use the setenv.ksh template to set various environment variables for Tuxedo applications, e.g. TUXDIR, PATH, and APPDIR.

Furthermore, the system provides a deployment descriptor and an undeployment descriptor for each machine according to the above information. Users can modify the two descriptors according to their own requirements.

The deployment descriptor is a script describing the steps which can be taken after the distribution package is distributed to the destination machines. The following Listing 2 shows an exemplary deployment descriptor.

Listing 2

```
#!/usr/bin/sh
. setenv.ksh
tlistpwd $TUXDIR
tmloadcf -y UBBCONFIG
...
```

The undeployment descriptor is a script describing the steps which can be taken when users want to undeploy the domain. The following Listing 3 shows an exemplary undeployment descriptor.

Listing 3

```
. setenv.ksh
kill -9 tlisten
rm -rf $APPDIR
...
```

In accordance with an embodiment of the invention, the distribution packages can be generated to contain the modified setenv.ksh (setenv.cmd) template, UBBCONFIG, DMCONFIG, deployment/undeployment descriptor and the compiled binary executable files.

Data Repository

In accordance with an embodiment of the invention, both the application packages and the distribution packages can be stored in the data repository.

Figure 12:
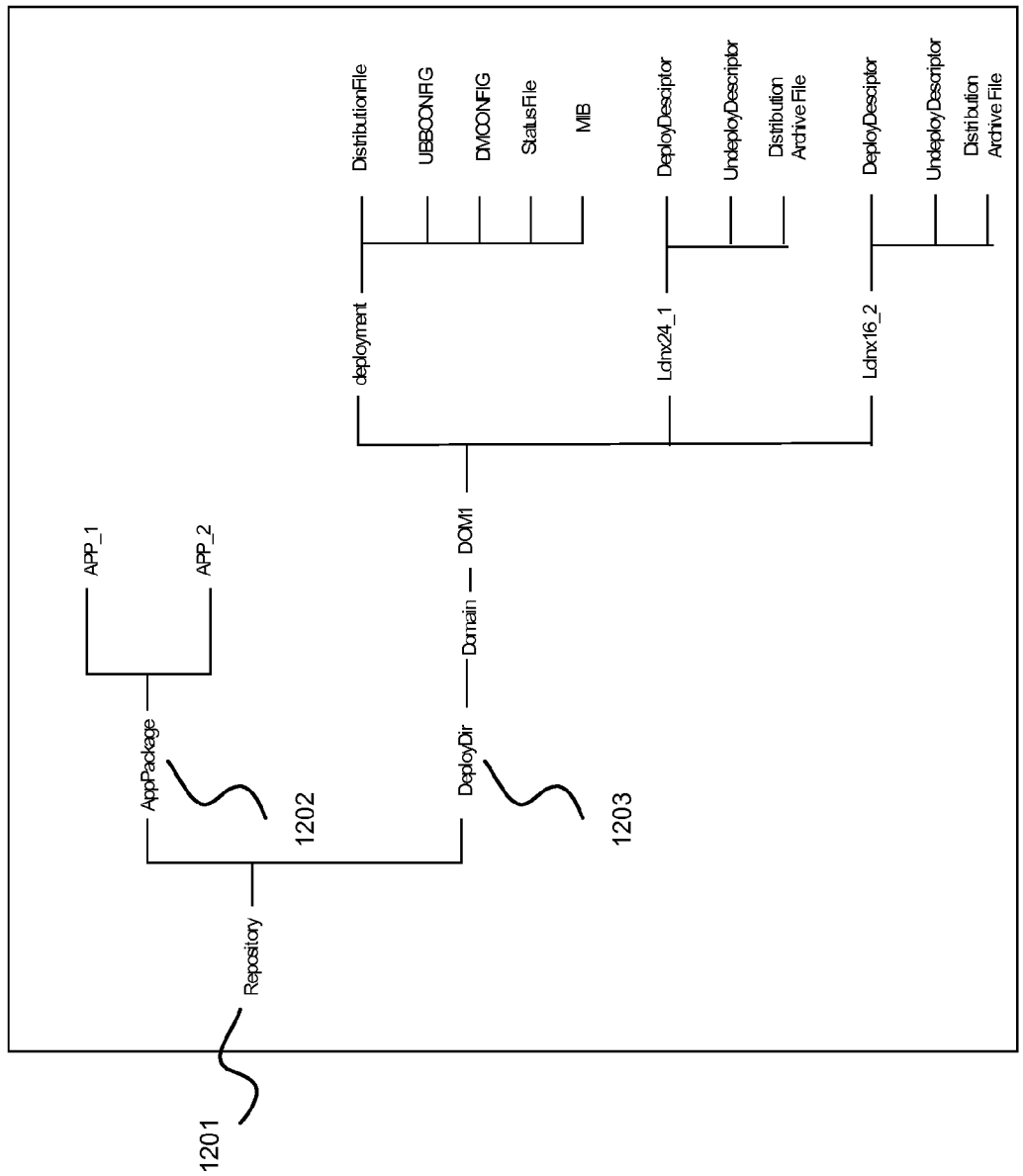
FIG. 12 shows an illustration of the internal structure of the data repository, in accordance with an embodiment of the invention.

FIG. 12 shows an illustration of the internal structure of the data repository, in accordance with an embodiment of the invention. As shown in FIG. 12, the data repository, Repository 1201, includes an application package directory, AppPackage 1202, and a deployment directory, DeployDir 1203. The original uploaded application packages are stored under the AppPackage directory 1202, while the deployment units, such as domains, are stored under the DeployDir directory 1203.

As shown in FIG. 12, the domain name is 'DOM1', and the machine names are 'IcInx24' and 'IcInx26', each of which contains a DeployDescriptor, an UndeployDescriptor, and various distribution packages.

Additionally, one application package can be added to a single machine in a domain for multiple times, in which case the system can automatically create an index for it, e.g. APP1_1, APP1_2, etc.

Deploy/Undeploy a Tuxedo Domain

In accordance with an embodiment of the invention, the deployment center can deploy the distribution archive files to every destination machine according to a distribution file. Subsequently, the deployment agent can configure and set the Tuxedo system. If successful, the system can record the status of the Tuxedo system into a status file. If the deployment of any machine in the domain fails, the system can roll back the deployment operations that have been done.

Figure 13:
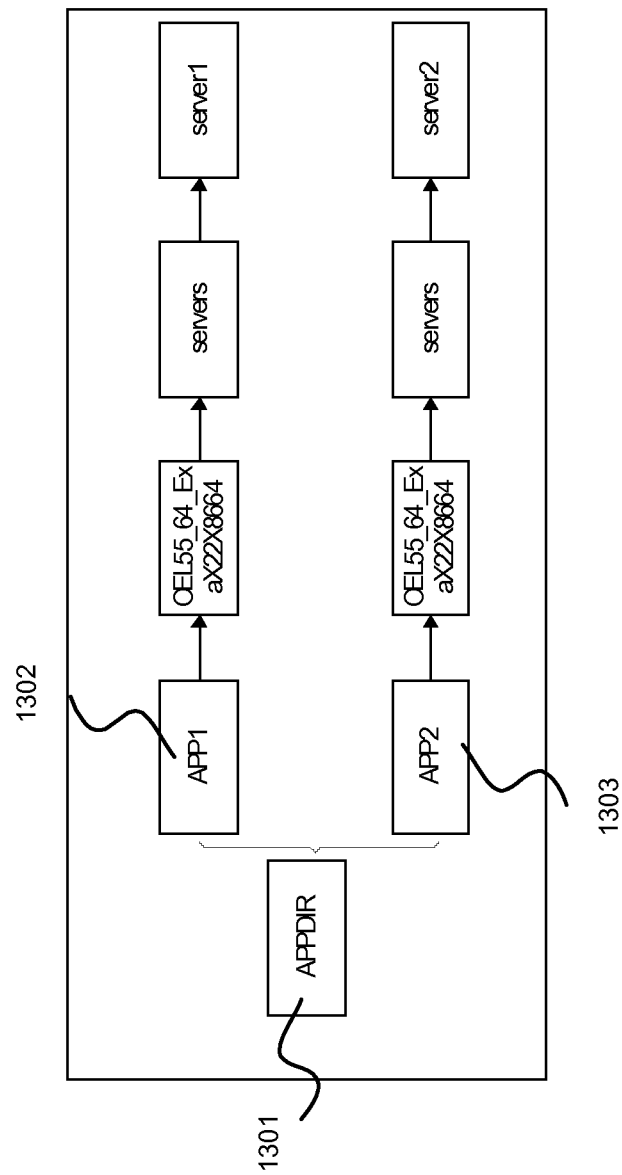
FIG. 13 shows an illustration of the structure of an application directory, in accordance with an embodiment of the invention.

FIG. 13 shows an illustration of the structure of an application directory, in accordance with an embodiment of the invention. As shown in FIG. 13, an application directory, APPDIR 1301, is create to include multiple subdirectories, APP1 1302 and APP2 1303, for containing deployment file for different applications after a successful deployment.

Additionally, when the domain is in a shutdown status, then users can undeploy the Tuxedo application. Furthermore, a deployment agent on a deployed machine can use the undeployment descriptor to perform the undeployment tasks.

Boot/Shutdown the Tuxedo Application

In accordance with an embodiment of the invention, after the Tuxedo application is deployed to the destination machine, the deployment center can connect with the deploy agents, so that the users can choose to boot the whole system. When the system is successfully booted, the system can record the status into a status file and update the status of the domain. The users are allowed to perform the dynamic deployment, once the domain has been successfully booted. On the other hand, the booted Tuxedo system may be shutdown if any error is found.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

Appendix A

In accordance with an embodiment of the invention, the system can provide an UBB_Resource template to the Tuxedo users for defining the RESOURCE section. When creating a domain, a user can choose this template to generate the RESOURCES section for UBBCONFIG. An exemplary item list in the template is shown in the following Table 3.

TABLE 3

| Item | Value |
|---|---|
| IPCKEY | 33333 |
| MASTER | NULL |
|  | When the users specify which machine is master, this item will be generated automatically. |
| MODE | User can specify SHM or MP. |

The items in the above Table 3 can be modified by the users except the MASTER item. The MASTER item can be filled when the users specify which machine is a master in a domain and which machine is the backup. Users can add other parameters besides these parameters. Users can also create their own UBB_Resource templates and save them to the system. In all templates, the MASTER can be filled by the system automatically following above rules.

In accordance with an embodiment of the invention, the system can provide an UBB_Machine template to the Tuxedo users. When creating a domain and specifying machine, a user can choose this template to generate the MACHINES section for the UBBCONFIG file. An exemplary item list in the template is shown in the following Table 4.

TABLE 4

| Item | Value |
|---|---|
| ADDRESS | This is generated by the system according to the machine's logical name. Can't be modified by the users. |
| LMID | This is generated automatically by the system. The naming rule is SITE1, SITE2 . . . , can't be modified by the users. |
| APPDIR | Specified by the users when they add machines to one domain. |
| TUXCONFIG | Be default, it's the $APPDIR/tuxconfig. Because the tuxconfig can be placed in raw disk, so users can fill it with other value, and this feature will deploy tuxconfig to that place according to it. |
| TUXDIR | This is generated automatically by the system using the TUXDIR specified by the machine list. Users can not modify it. |

Users can add other parameters of MACHINES section to the UBBCONFIG file. Users can also specify the TLOG to raw disk, and the system can delete it when undeploying this domain. User can also create additional UBB_Machine templates and save them to the system. The parameters replacement rule can follow the above.

In accordance with an embodiment of the invention, when the users add an application package to one domain, the system can replace some parameters of the GROUPS section in the UBB_part of that package. An exemplary item list in the template is shown in the following Table 5.

TABLE 5

| Item | Value |
|---|---|
| GROUPNAME | This is generated automatically by the system. The naming rule is GROUP1, GROUP2 . . . , can't be modified by the users. |

TABLE 5-continued

| Item | Value |
| --- | --- |
| LMID | This is generated by the system according to the machine which the package is deployed to. |
| GRPNO | This is generated automatically by the system. It can't be modified by the customers. |

The system can keep the values of other parameters of GROUPS section in a UBB_part file, and allows the users to modify them freely. Similarly, users can add other parameters to the UBBCONFIG file.

In accordance with an embodiment of the invention, when adding an application package to one domain, the system can replace some parameters of the RMS section in the UBB_part of that package. An exemplary item list in the template is shown in the following Table 6.

TABLE 6

| Item | Value |
| --- | --- |
| RMSNAME | This is generated automatically by the system. The naming rule is RMS1, RMS2 . . . , can't be modified by the users. |
| SRVGRP | This will be replaced with the group's new name which is generated by the system before. This can't be modified by the customers. |
| RMID | This is generated automatically by the system. The naming rule is 1, 2 and so on. It can't be modified by the customers. |

The system can keep the values of other parameters i RMS section in a UBB_part file, and allows the users to modify them freely. Similarly, the users can add other parameters to the UBBCONFIG.

In accordance with an embodiment of the invention, all the parameters in the NETGROUPS section can be filled by the users themselves if they need.

In accordance with an embodiment of the invention, the NETWORK section is also in the UBB_Machine template. If the domain is in a MP mode, then system can automatically add this section to the UBBCONFIG. An exemplary item list in the template is shown in the following Table 7.

TABLE 7

| Item | Value |
| --- | --- |
| LMID | This is generated automatically by the system. The users can't modify it. |
| NADDR | The system will generate //hostname:port_number, and users can modify the port_number. |
| NLSADDR | The system will generate //hostname:port_number, and users can modify the port_number. |

Additionally, users can add other parameters to the NETWORK section.

In accordance with an embodiment of the invention, when adding an application package to one domain, the system can replace some parameters of the SERVERS section in the UBB_part of that package. An exemplary item list in the template is shown in the following Table 8.

TABLE 8

| Item | Value |
| --- | --- |
| SVRGRP | This will be replaced with the group's new name which is generated by the system before. This can't be modified by the customers. |
| SRVID | This is generated automatically by the system. The naming rule is 1, 2 . . . , can't be modified by the users. |

The system can keep the values of other parameters of SERVERS section in UBB_part file, and allows the users to modify them freely. Similarly, the users can add other parameters to the UBBCONFIG.

In accordance with an embodiment of the invention, when adding an application package to one domain, system can replace some parameters of the SERVICES section in the UBB_part of that package. An exemplary item list in the template is shown in the following Table 9.

TABLE 9

| Item | Value |
| --- | --- |
| SRVGRP | If the UBB_part has this parameter, then system will replace it with the corresponding group generated before. Although this parameter is not a required parameter, we recommend users to add it. When there're same services in different application packages, they can have different operations. |
| ROUTING | If the UBB_part has this parameter, then system will replace it with the corresponding routing name generate by the system. |

The system can keep the values of other parameters of SERVICES section in UBB_part file, and allows the users to modify them freely. Similarly, the users can add other parameters to the UBBCONFIG.

In accordance with an embodiment of the invention, when adding an application package to a domain, the system can replace some parameters of the ROUTING section in the UBB_part of that package. An exemplary item list in the template is shown in the following Table 10.

TABLE 10

| Item | Value |
| --- | --- |
| ROUTING_CRITERIA_NAME | This is generated automatically by the system. The naming rule is ROUTING1, ROUTING2 . . . , can't be modified by the users. |
| RANGES | This parameter's group will be replaced by the system. |

The system can keep the values of other parameters of ROUTING section in UBB_part file, and allows the users to modify them freely. Similarly, the users can add other parameters to the UBBCONFIG.

What is claimed is:

1. A method for supporting automatically deploying application components in a transactional middleware machine environment, comprising:
   receiving a plurality of application packages, wherein each application package contains binary files for one or more transactional servers and configuration information that describes relationship and parameters of the one or more transactional servers in the application package;
   generating one or more distribution packages on one or more microprocessors for each transactional middleware machine of a plurality of transactional middleware machines in the transactional middleware machine environment based on the one or more application packages;
   automatically generating configuration metadata for each transactional middleware machine of a plurality of transactional middleware machines in the transactional middleware machine environment based on the configuration information in the application package;
   wherein each distribution package includes a plurality of application packages and identifies for each application package, a plurality of candidate transactional middleware machines and includes, for each of said identified plurality of candidate transactional middleware machines, automatically generated configuration metadata, one or more of said binary files for said one or more transactional servers, and an environment file for each of said one or more transactional servers;

dynamically deploying the one or more distribution packages to the plurality of candidate transactional middleware machines in the transactional middleware machine environment; and automatically booting selected transactional servers from said one or more distribution packages on selected transactional middleware machines of said plurality of candidate transactional middleware machines in response to resource usage information.

2. The method of claim 1, further comprising allowing each application package to contain information about a platform that the application package can be deployed to.

3. The method of claim 1, further comprising applying an application package to different transactional domains, wherein each transactional domain includes one or more transactional middleware machines.

4. The method of claim 1, further comprising creating one or more application directories on each transactional middleware machine that is deployed with one or more transactional servers, based on the application packages.

5. The method of claim 1, further comprising deploying multiple application packages into a same application directory.

6. The method of claim 1, further comprising providing a data repository that stores the one or more application packages uploaded by a user.

7. The method of claim 1, further comprising deploying a transactional application that includes multiple application packages to either a single transactional middleware machine or multiple cross-connected transactional middleware machines.

8. The method of claim 1, wherein each said application package is a compressed file that contains:
 a first tier that contains names of the application package,
 a second tier that contains the configuration information that describes relationship and parameters of the one or more transactional servers in the application package, and
 a third tier that contains compiled binary files for the transactional servers.

9. The method of claim 1, further comprising undeploying at least one distribution package from the plurality of transactional middleware machines in the transactional middleware machine environment.

10. A system for supporting automatically deploying application components in a transactional middleware machine environment, comprising:
 one or more microprocessors;
 a deployment center running on the one or more microprocessors in the transactional middleware machine environment, wherein the deployment center is configured for:
  receiving a plurality of application packages, wherein each application package contains binary files for one or more transactional servers and configuration information that describes relationship and parameters of the one or more transactional servers in the application package;
  automatically generating configuration metadata for each transactional middleware machine of a plurality of transactional middleware machines in the transactional middleware machine environment based on the configuration information in the application package;
  generating one or more distribution packages for each transactional middleware machine of a plurality of transactional middleware machines in the transactional middleware machine environment based on the one or more application packages, wherein each distribution package includes a plurality of application packages and identifies for each of said plurality of application packages a plurality of candidate transactional middleware machines, and includes, for each of said identified plurality of candidate transactional middleware machines, automatically generated configuration metadata, one or more of said binary files for said one or more transactional servers, and an environment file for each of said one or more transactional servers;
  dynamically deploying the one or more distribution packages to the plurality of candidate transactional middleware machines in the transactional middleware machine environment; and
  automatically booting selected transactional servers from said one or more distribution packages on selected transactional middleware machines of said plurality of candidate transactional middleware machines in response to resource usage information.

11. The system of claim 10, wherein each application package is allowed to contain information about a platform that the application package can be deployed to.

12. The system of claim 10, wherein an application package is applied to different transactional domains, wherein each transactional domain includes one or more transactional middleware machines.

13. The system of claim 10, wherein the one or more application directories are created on each transactional middleware machine that is deployed with one or more transactional servers, based on the application packages.

14. The system of claim 10, wherein the deployment center is capable of deploying multiple application packages into a same application directory.

15. The system of claim 10, further comprising a data repository that stores the one or more application packages uploaded by a user.

16. The system of claim 10, wherein the deployment center is capable of deploying a transactional application that includes multiple application packages to either a single transactional middleware machine or multiple cross-connected transactional middleware machines.

17. The system of claim 10, wherein each said application package is a compressed file that contains:
 a first tier that contains names of the application package,
 a second tier that contains the configuration information that describes relationship and parameters of the one or more transactional servers in the application package, and
 a third tier that contains compiled binary files for the transactional servers.

18. A non-transitory computer-readable medium having instructions recorded thereon for supporting automatically deploying application components in a transactional middleware machine environment, which instructions, when executed by a computer, cause the computer to perform steps comprising:
 receiving a plurality of application packages, wherein each application package contains binary files for one or more transactional servers and configuration information that describes relationship and parameters of the one or more transactional servers in the application package;

automatically generating configuration metadata for each transactional middleware machine of a plurality of transactional middleware machines in the transactional middleware machine environment based on the configuration information in the application package;

generating one or more distribution packages on one or more microprocessors for each transactional middleware machine of a plurality of transactional middleware machines in the transactional middleware machine environment based on the one or more application packages;

wherein each distribution package includes a plurality of application packages and identifies for each application package, a plurality of candidate transactional middleware machines and includes, for each of said identified plurality of candidate transactional middleware machines, automatically generated configuration metadata, one or more of said binary files for said one or more transactional servers, and an environment file for each of said one or more transactional servers;

dynamically deploying the one or more distribution packages to the plurality of candidate transactional middleware machines in the transactional middleware machine environment; and automatically booting selected transactional servers of said plurality of application packages from said one or more distribution packages on selected transactional middeware machines of said plurality of candidate transactional middleware machines in response to resource usage information.

\* \* \* \* \*